US00RE48917E

(19) United States
(12) Reissued Patent
Yang

(10) Patent Number: US RE48,917 E
(45) Date of Reissued Patent: Feb. 1, 2022

(54) WIDEBAND DEFORMED DIPOLE ANTENNA FOR LTE AND GPS BANDS

(71) Applicant: TAOGLAS GROUP HOLDINGS LIMITED, Enniscorthy (IE)

(72) Inventor: Wen Chieh Yang, Taoyuan (TW)

(73) Assignee: TAOGLAS GROUP HOLDINGS LIMITED, Enniscorthy (IE)

(21) Appl. No.: 16/262,019

(22) Filed: Jan. 30, 2019

Related U.S. Patent Documents

Reissue of:
(64) Patent No.: 9,559,423
Issued: Jan. 31, 2017
Appl. No.: 14/438,613
PCT Filed: Oct. 8, 2013
PCT No.: PCT/US2013/063949
§ 371 (c)(1),
(2) Date: May 1, 2015
PCT Pub. No.: WO2014/058928
PCT Pub. Date: Apr. 17, 2014

U.S. Applications:
(60) Provisional application No. 61/711,194, filed on Oct. 8, 2012.

(51) Int. Cl.

| | |
|---|---|
| ***H01Q 9/20*** | (2006.01) |
| ***H01Q 9/28*** | (2006.01) |
| ***H01Q 5/364*** | (2015.01) |
| ***H01Q 5/371*** | (2015.01) |
| ***H01Q 1/38*** | (2006.01) |
| *H01Q 13/04* | (2006.01) |

(52) U.S. Cl.
CPC ..... *H01Q 9/20* (2013.01); *H01Q 1/38* (2013.01); *H01Q 5/364* (2015.01); *H01Q 5/371* (2015.01); *H01Q 9/28* (2013.01); *H01Q 9/285* (2013.01); *H01Q 13/04* (2013.01)

(58) Field of Classification Search
None
See application file for complete search history.

(56) References Cited

U.S. PATENT DOCUMENTS

| | | | | |
|---|---|---|---|---|
| 7,800,550 | B2 * | 9/2010 | Hsieh | H01Q 1/38 343/795 |
| 8,761,699 | B2 * | 6/2014 | Li | H01Q 1/38 343/700 MS |
| 2002/0024468 | A1 * | 2/2002 | Palmer | H01Q 1/08 343/702 |
| 2004/0027304 | A1 * | 2/2004 | Chiang | H01Q 21/205 343/810 |
| 2009/0121947 | A1 * | 5/2009 | Nysen | H01Q 7/00 343/702 |
| 2011/0221648 | A1 * | 9/2011 | Lee | H01Q 9/285 343/826 |
| 2012/0169560 | A1 * | 7/2012 | Lee | H01Q 5/371 343/770 |
| 2013/0187820 | A1 * | 7/2013 | Ng | H01Q 5/371 343/793 |

* cited by examiner

*Primary Examiner* — Nick Corsaro
(74) *Attorney, Agent, or Firm* — Garson & Gutierrez, PC

(57) ABSTRACT

A deformed dipole is suggested with trace elements configured for wideband LTE and GPS operation. The deformed dipole comprises a first dipole conductor disposed on a first surface and first side of the circuit board and a second dipole conductor disposed on an opposite surface and opposite side of the circuit board.

24 Claims, 4 Drawing Sheets

Top View

Top View

Side View

Bottom View

Top View

Bottom View

WIDEBAND DEFORMED DIPOLE ANTENNA FOR LTE AND GPS BANDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This invention relates to antennas; and more particularly, to a wideband deformed dipole antenna having two parallel opposing sections and configured for LTE and GPS bands.

BACKGROUND ART

Long Tern Evolution (LTE) communication technology is becoming increasingly popular. Earlier 2G/3G communication technologies are limited by protocol. LTE technologies are improving application speeds significantly. Currently, an increasing number of high tech electronic devices are being designed to function over LTE bands.

Antennas in LTE capable devices are a critical component because the LTE operation bandwidth is widespread, giving rise to greater potential impact from detuning effects. Achieving such wideband application in a single antenna is a difficult objective.

Modern electronic devices can benefit from a resonant trace for global positioning system (GPS) bands.

SUMMARY

Technical Problem

There is a need for an antenna configured for multiple resonances spanning the wideband LTE spectrum, the antenna being capable of high efficiency and resisting of detuning effects. It is beneficial to cover the entire spectrum of LTE communication bands for communications as well as GPS bands for providing location based services.

Solution to the Problem

A deformed dipole is suggested with trace elements configured for wideband LTE and GPS operation. The deformed dipole comprises a first dipole conductor disposed on a first surface and first side of the circuit board and a second dipole conductor disposed on an opposite surface and opposite side of the circuit board.

Advantageous Effects of the Invention

The deformed dipole antenna provides multiple resonant traces to create wideband coverage over LTE bands.

The antenna has two arm traces for each side resulting in increased antenna bandwidth.

The antenna has another resonant trace stub in the center placement for each side for creating a resonate mode covering the GPS band.

The antenna incorporates double side print traces on each side of the circuit board. For assembly reasons half the antenna trace in disposed in a different layer. Two layers are connected by through-vias for reducing assembly failure rates.

In further consideration of assembly, a small rectangular pad on the top layer is provided for the coax cable. The rectangular pad, referred to as a "coax alignment pad" assists with aligning the coaxial cable through a middle axis of the circuit board, thereby reducing interference from the attached cable and improving performance of the antenna.

The antenna is designed with H-shaped sections having slots for tuning harmonics of the antenna.

DESCRIPTION OF EMBODIMENTS

A deformed dipole is suggested with trace elements configured for wideband LTE and GPS operation. The deformed dipole comprises a first dipole conductor disposed on a first surface and first side of a circuit board, and a second dipole conductor disposed on an opposite surface and opposite side of the circuit board. The first and second dipole conductors are similar in size and shape. Each dipole conductor comprises a series of trace elements configured for multiple LTE resonances, and a resonant trace stub tuned for the GPS band.

In the disclosed antenna, the deformed dipole antenna design achieves multiple resonances. The resultant bandwidth can cover the entire spectrum of LTE operation bands. The antenna has bent traces and reserved slots at the end of each deform dipole element. The slots are used to control fundamental and harmonic modes to achieves a very wide bandwidth response. The antenna also has a resonant stub to dedicate GPS band application.

Thus, the disclosed deformed dipole antenna is configured for LTE and GPS bands for use in modern electronic devices.

Example

Figure 1:
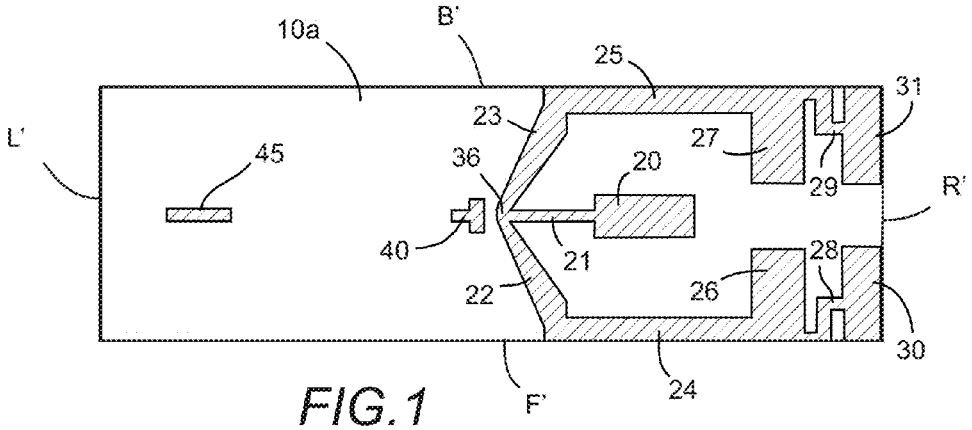
FIG. 1 shows a top view of a wideband LTE and GPS deform dipole antenna and associated trace elements.

Now turning to the drawings:

FIG. 1 shows a top view of a wideband LTE and GPS deform dipole antenna and associated trace elements.

A first dipole conductor is printed or otherwise disposed on a top right side surface of a circuit board 10a.

The first dipole conductor comprises a first apex 36 positioned near a center of the circuit board. A first arm section 22 extends from the first apex toward a front side peripheral edge F', or periphery. A first L-shaped section 24 extends from the first arm section to a first L-shaped stub 26 along the front peripheral edge. A first H-shaped section 28 extends from the first L-shaped stub to a first H-shaped stub 30.

The first dipole conductor further comprises a second arm section 23 extending from the first apex toward a rear side peripheral edge B', or periphery. A second L-shaped section 25 extends from the second arm section to a second L-shaped stub 27 along the rear peripheral edge. A second H-shaped section 29 extends from the second L-shaped stub to a second H-shaped stub 31.

A first resonant trace stub 20 is disposed between the first and second L-shaped sections. The first resonant trace stub 20 is configured for GPS band resonance, and is coupled to the first apex by a first trace conductor 21 extending therebetween.

The antenna further comprises a second conductor solder pad 40 positioned on the top surface and being coupled to the second dipole conductor by a through via extending through the circuit board volume.

The antenna may optionally comprise a coaxial cable alignment pad 45 disposed on a top left surface of the circuit board. The alignment pad is positioned along a center axis extending through the middle of the circuit board along a length thereof, and is used to align an attached coaxial cable for reducing detuning effects caused by an unbalanced and interfering cable.

Figure 2:
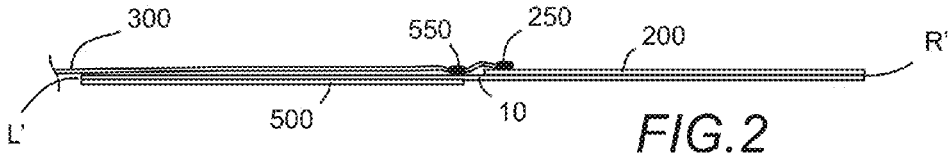
FIG. 2 shows a side view of the deform dipole antenna.

FIG. 2 shows a side view of the deform dipole antenna.

The antenna comprises a circuit board 10 having a first dipole conductor 200 disposed on a top right surface thereof, and a second dipole conductor 500 disposed on a bottom left surface thereof. A coaxial cable 300 is used to drive the antenna, the coaxial cable being coupled to the first dipole conductor at a first solder connection 250, and further coupled to the second dipole conductor at a second solder connection 550.

Figure 3:
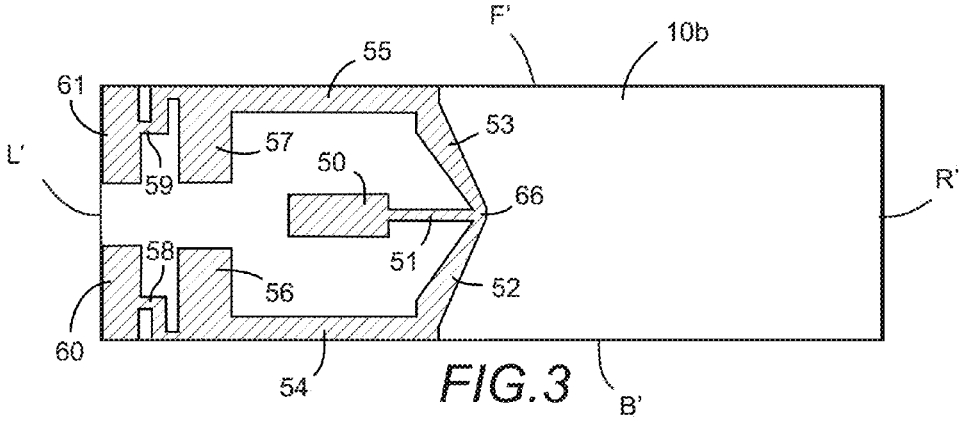
FIG. 3 shows a bottom view of the deformed dipole antenna and associated trace elements.

FIG. 3 shows a bottom view of the deformed dipole antenna and associated trace elements.

The second dipole conductor is printed or otherwise disposed on a bottom left side surface of the circuit board 10b.

The second dipole conductor comprises a second apex 66 positioned near a center of the circuit board. A third arm section 52 extends from the second apex toward the rear side peripheral edge R', or periphery. A third L-shaped section 54 extends from the third arm section to a third L-shaped stub 56 along the rear peripheral edge. A third H-shaped section 58 extends from the third L-shaped stub to a third H-shaped stub 60.

The second dipole conductor further comprises a fourth arm section 53 extending from the second apex toward a front side peripheral edge F', or periphery. A fourth L-shaped section 55 extends from the fourth arm section to a fourth L-shaped stub 57 along the front peripheral edge. A fourth H-shaped section 59 extends from the fourth L-shaped stub to a fourth H-shaped stub 61.

A second resonant trace stub 50 is disposed between the third and fourth L-shaped sections. The second resonant trace stub 50 is configured for GPS band resonance, and is coupled to the second apex by a second trace conductor 51 extending therebetween.

Figure 4:
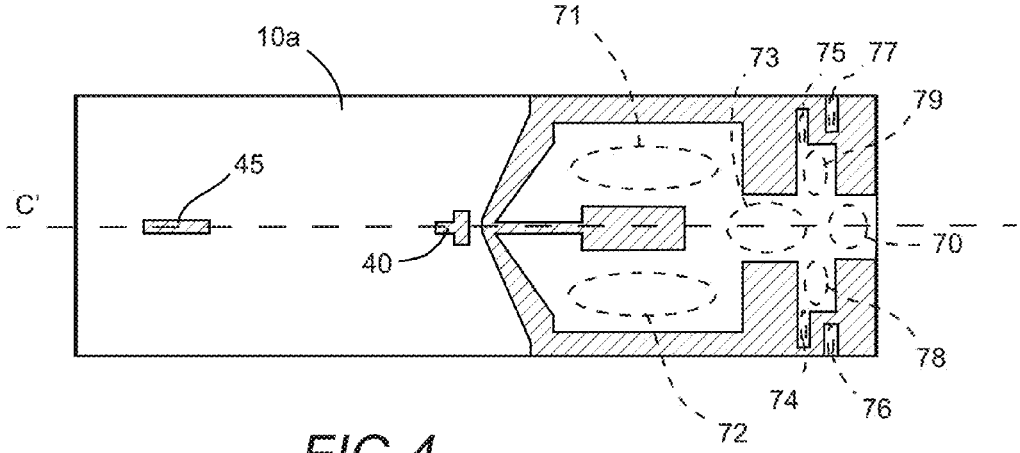
FIG. 4 shows a top view of the deform dipole antenna and associated top gaps disposed between trace elements on the top surface.

FIG. 4 shows a top view of the deform dipole antenna and associated top gaps disposed between trace elements on the top surface.

The first dipole conductor further comprises a plurality of gaps disposed on the first surface. A first top gap 70 is shown, wherein the first and second H-shaped stubs are separated by the first gap extending therebetween. A second top gap 71 is disposed between the first resonant trace stub and the second L-shaped section. A third top gap 72 is disposed between the first resonant trace stub and the first L-shaped section. A fourth top gap 73 is disposed between the first and second L-shaped stubs.

The first and second H-shaped sections each comprise a parallel trace disposed between the respective H-shaped stub and a nearby L-shaped stub. The parallel traces are each coupled between the H and L shaped stubs via a pair of connections extending therebetween.

A fifth top gap 74 is disposed between the first parallel trace and the first L-shaped stub. A sixth top gap 75 is disposed between the second parallel trace and the second L-shaped stub.

A seventh top gap 76 is disposed between the first parallel trace and the first H-shaped stub. An eighth top gap 77 is disposed between the second parallel trace and the second H-shaped stub.

A ninth top gap 78 is disposed between the first H-shaped stub and the first L-shaped stub. A tenth top gap 79 is disposed between the second H-shaped stub and the second L-shaped stub.

Figure 5:
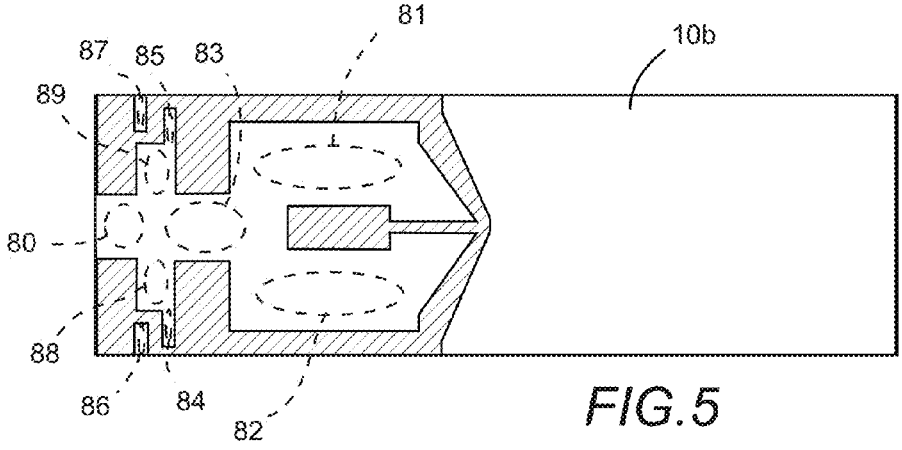
FIG. 5 shows a bottom view of the deform dipole antenna and associated bottom gaps disposed between trace elements on the bottom surface.

FIG. 5 shows a bottom view of the deform dipole antenna and associated bottom gaps disposed between trace elements on the bottom surface.

The second dipole conductor is similar to the first dipole conductor in form and structure, but is a mirror image therewith. The second dipole conductor comprises ten bottom gaps, including a first through a tenth bottom gap. Each of the bottom gaps are configured near second conductor trace elements in a similar fashion as the counterpart top gaps and first conductor trace elements.

Figure 6:
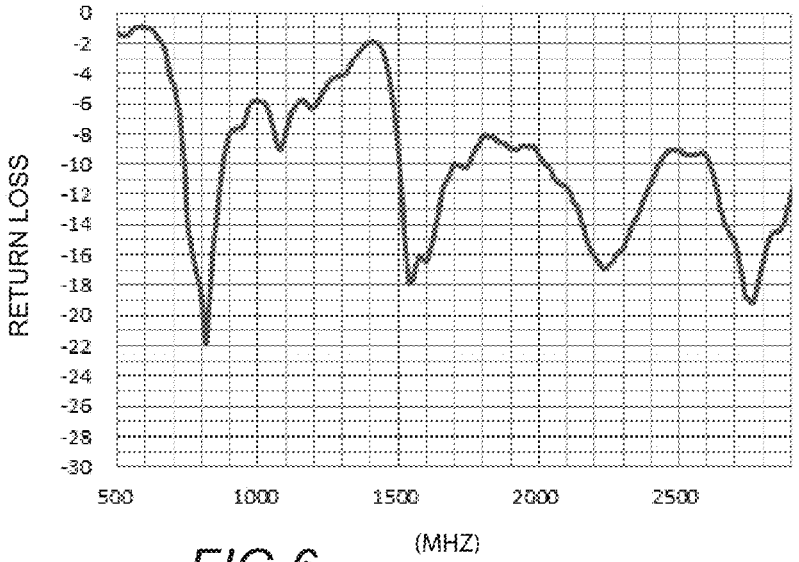
FIG. 6 is a plot illustrating return loss of the antenna.

FIG. 6 is a plot illustrating return loss of the antenna.

Figure 7:
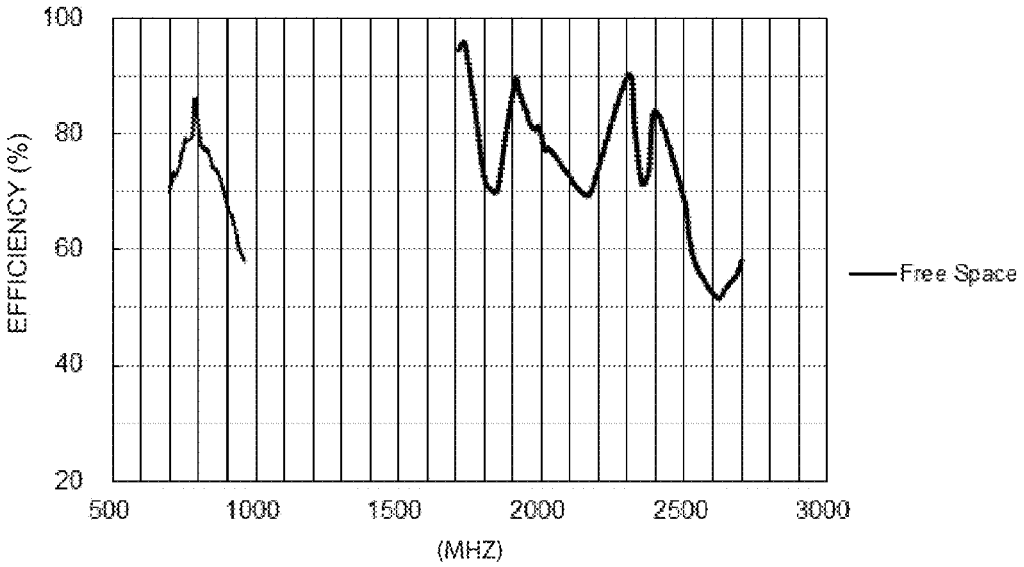
FIG. 7 is a plot showing efficiency of the antenna.

FIG. 7 is a plot showing efficiency of the antenna.

Figure 8:
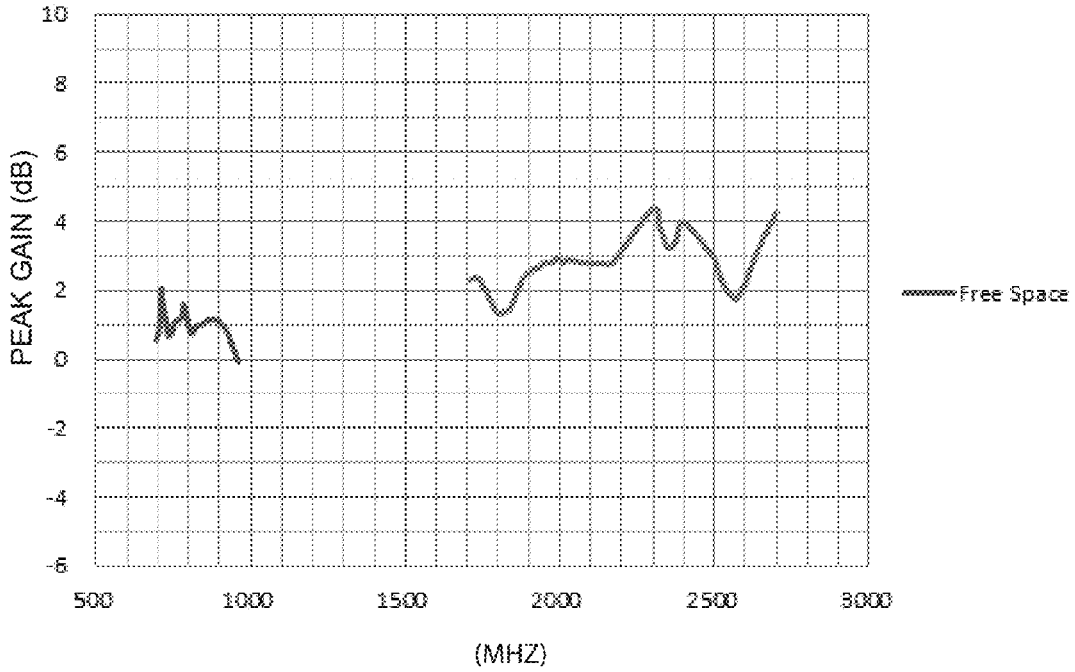
FIG. 8 is plot showing peak gain of the antenna.

FIG. 8 is plot showing peak gain of the antenna.

INDUSTRIAL APPLICABILITY

The disclosed antenna is applicable to the wireless communications and location service industry and is configured for wideband LTE and GPS operation.

| REFERENCE SIGNS LIST | |
|---|---|
| (L') | left side |
| (R') | right Side |
| (10) | circuit board |
| (10a) | top surface of circuit board |
| (10b) | bottom surface of circuit board |
| (20) | first resonant trace stub |
| (21) | first trace conductor |
| (22) | first arm section |
| (23) | second arm section |
| (24) | first L-shaped section |
| (25) | second L-shaped section |
| (26) | first L-shaped stub |
| (27) | second L-shaped stub |
| (28) | first H-shaped section |
| (29) | second H-shaped section |
| (30) | first H-shaped stub |
| (31) | second H-shaped stub |
| (36) | first apex |
| (40) | second conductor solder pad |
| (45) | coax alignment pad |
| (50) | fourth resonant trace stub |
| (51) | fourth trace conductor |
| (52) | third arm section |
| (53) | fourth arm section |
| (54) | third L-shaped section |
| (55) | fourth L-shaped section |
| (56) | third L-shaped stub |
| (57) | fourth L-shaped stub |
| (58) | third H-shaped section |
| (59) | fourth H-shaped section |
| (60) | third H-shaped stub |
| (61) | fourth H-shaped stub |
| (66) | second apex |

-continued

| REFERENCE SIGNS LIST |
|---|
| (70) first top gap |
| (71) second top gap |
| (72) third top gap |
| (73) fourth top gap |
| (74) fifth top gap |
| (75) sixth top gap |
| (76) seventh top gap |
| (77) eighth top gap |
| (78) ninth top gap |
| (79) tenth top gap |
| (80) first bottom gap |
| (81) second bottom gap |
| (82) third bottom gap |
| (83) fourth bottom gap |
| (84) fifth bottom gap |
| (85) sixth bottom gap |
| (86) seventh bottom gap |
| (87) eighth bottom gap |
| (88) ninth bottom gap |
| (89) tenth bottom gap |
| (200) first dipole conductor |
| (250) first connection |
| (300) coaxial cable |
| (500) second dipole conductor |
| (550) second connection |

The invention claimed is:

1. A deformed dipole antenna configured for wideband LTE and GPS bands, the antenna comprising:

a circuit board (10) having a top surface and a bottom surface, each of the top surface and the bottom surface of the circuit board being divided into a left portion and a right portion of equal proportions forming a left top area, a right top area, a left bottom area, and a right bottom area;

a first dipole conductor (200) disposed on a top right surface of the circuit board, the first dipole conductor comprising:

a first apex (36) disposed near a center of the circuit board on the top surface;

a first arm section (22) extending from the first apex to a front peripheral edge (F') of the circuit board;

a first L-shaped section (24) extending along the front peripheral edge from the first arm to a first L-shaped stub (26);

a first H-shaped section (28) extending from the first L-shaped stub to a first H-shaped stub (30);

a second arm section (23) extending from the first apex to a rear peripheral edge (B') of the circuit board;

a second L-shaped section (25) extending along the rear peripheral edge from the second arm to a second L-shaped stub (27);

a second H-shaped section (29) extending from the second L-shaped stub to a second H-shaped stub (31); and a first resonant trace stub (20) disposed between the first and second L-shaped sections, the first resonant trace stub being coupled to the first apex via a first trace conductor (21) extending therebetween;

a second dipole conductor (500) disposed on a bottom left surface of the circuit board, the second dipole conductor comprising:

a second apex (66) disposed near a center of the circuit board on the bottom surface;

a third arm section (52) extending from the second apex to the rear peripheral edge of the circuit board;

a third L-shaped section (54) extending along the rear peripheral edge from the third arm to a first L-shaped stub (56);

a third H-shaped section (58) extending from the third L-shaped stub to a third H-shaped stub (60);

a fourth arm section (53) extending from the second apex to the front peripheral edge of the circuit board;

a fourth L-shaped section (55) extending along the front peripheral edge from the fourth arm to a fourth L-shaped stub (57);

a fourth H-shaped section (59) extending from the fourth L-shaped stub to a fourth H-shaped stub (61); and a second resonant trace stub (50) disposed between the third and fourth L-shaped sections, the second resonant trace stub being coupled to the second apex via a second trace conductor (51) extending therebetween;

a second conductor solder pad disposed on the top surface and connected to the second apex of the second dipole conductor by a through-via extending through the circuit board.

2. The antenna of claim 1, further comprising a coaxial cable alignment pad (45) disposed on the first left surface of the circuit board and configured to aid in the alignment of a coaxial cable between a longitudinal center axis (C') of the circuit board.

3. The antenna of claim 1, wherein said first H-shaped stub is separated from said second H-shaped stub by a first top gap (70) disposed therebetween.

4. The antenna of claim 1, wherein said first L-shaped section is separated from said first resonant trace stub by a second top gap (72) extending therebetween.

5. The antenna of claim 1, wherein said second L-shaped section is separated from said first resonant trace stub by a third top gap (71) extending therebetween.

6. The antenna of claim 1, wherein said first L-shaped stub is separated from said second L-shaped stub by a fourth top gap (73) extending therebetween.

7. The antenna of claim 1, wherein said first H-shaped stub is separated from said first L-shaped stub by a ninth top gap (78) extending therebetween.

8. The antenna of claim 7, said first H-shaped section comprising a first parallel trace coupled to the first L-shaped stub by a first connection extending therebetween along the front peripheral edge of the circuit board.

9. The antenna of claim 8, said first parallel trace being further coupled to the first H-shaped stub by a second connection extending therebetween.

10. The antenna of claim 9, wherein said second connection is disposed between a seventh top gap (76) and the ninth top gap.

11. The antenna of claim 10, wherein said first parallel trace is separated from the first L-shaped stub by a fifth top gap (74) extending therebetween.

12. The antenna of claim 1, wherein said second H-shaped stub is separated from said second L-shaped stub by a tenth top gap (79) extending therebetween.

13. The antenna of claim 7, said second H-shaped section comprising a second parallel trace coupled to the second L-shaped stub by a third connection extending therebetween along the rear peripheral edge of the circuit board.

14. The antenna of claim 8, said second parallel trace being further coupled to the second H-shaped stub by a fourth connection extending therebetween.

15. The antenna of claim 9, wherein said fourth connection is disposed between an eighth top gap (77) and the tenth top gap.

16. The antenna of claim 10, wherein said second parallel trace is separated from the second L-shaped stub by a sixth top gap (75) extending therebetween.

17. The antenna of claim 1, wherein the first dipole conductor is a mirror image of the second dipole conductor.

*18. An antenna comprising:*

*a circuit board having a first surface, a second surface and a peripheral edge;*

*a first dipole conductor positioned on the first surface of the circuit board comprising:*

*a first apex;*

*a first arm section having a first arm section first end and a first arm section second end wherein the first arm section extends in a first direction from the first apex;*

*a first L-shaped section extending from the first arm section second end to a first L-shaped stub;*

*a first H-shaped section extending from the first L-shaped stub to a first H-shaped stub;*

*a second arm section having a second arm section first end and a second arm section second end wherein the second arm section extends in a second direction from the first apex;*

*a second L-shaped section extending from the second arm section second end to a second L-shaped stub;*

*a second H-shaped section extending from the second L-shaped stub to a second H-shaped stub;*

*a first resonant trace stub disposed between the first L-shaped section and the second L-shaped section, the first resonant trace stub being coupled to the first apex via a first trace conductor extending therebetween; and*

*a second dipole conductor disposed on the second surface of the circuit board.*

*19. The antenna of claim 18, wherein the first H-shaped section comprises a first parallel trace coupled to the first L-shaped stub by a first connection extending therebetween.*

*20. The antenna of claim 18, wherein the second H-shaped section comprises a second parallel trace coupled to the second L-shaped stub by a second connection extending therebetween.*

*21. The antenna of claim 18 wherein the second dipole conductor further comprises:*

*a second apex;*

*a third arm section having a third arm section first end and a third arm section second end wherein the third arm section extends in a first direction from the second apex;*

*a third L-shaped section extending from the third arm section second end to a third L-shaped stub;*

*a third H-shaped section extending from the third L-shaped stub to a third H-shaped stub;*

*a fourth arm section having a fourth arm section first end and a fourth arm section second end wherein the fourth arm section extends in a second direction from the second apex;*

*a fourth L-shaped section extending from the fourth arm section second end to a fourth L-shaped stub;*

*a fourth H-shaped section extending from the fourth L-shaped stub to a fourth H-shaped stub;*

*a second resonant trace stub disposed between the third L-shaped section and the fourth L-shaped section, the second resonant trace stub being coupled to the second apex via a second trace conductor extending therebetween; and*

*a second conductor solder pad disposed on the first surface and connected to the second apex of the second dipole conductor by a through-via extending through the circuit board.*

*22. The antenna of claim 21, wherein the third H-shaped section comprises a third parallel trace coupled to the third L-shaped stub by a third connection extending therebetween.*

*23. The antenna of claim 21, wherein the fourth H-shaped section comprises a fourth parallel trace coupled to the fourth L-shaped stub by a fourth connection extending therebetween.*

*24. The antenna of claim 18, further comprising a coaxial cable alignment pad disposed on the first surface of the circuit board.*

* * * * *